Dec. 25, 1956     C. G. LUDEMAN     2,775,710

METHOD OF RADIOLOGICAL SURVEYING

Filed Feb. 21, 1952     2 Sheets-Sheet 1

INVENTOR.
CLIFFORD G. LUDEMAN
BY
ATTORNEY

Dec. 25, 1956  C. G. LUDEMAN  2,775,710
METHOD OF RADIOLOGICAL SURVEYING
Filed Feb. 21, 1952  2 Sheets-Sheet 2

POSITIVE ANOMALY

NEGATIVE ANOMALY

INVENTOR.
CLIFFORD G. LUDEMAN
BY
ATTORNEY

United States Patent Office 2,775,710
Patented Dec. 25, 1956

2,775,710

METHOD OF RADIOLOGICAL SURVEYING

Clifford G. Ludeman, Scarsdale, N. Y., assignor to Texaco Development Corporation, New York, N. Y., a corporation of Delaware Application February 21, 1952, Serial No. 272,855

7 Claims. (Cl. 250—71)

This invention relates to the detection of radiation such as gamma rays, beta rays and alpha rays, and more particularly to the measurement of the intensity of such radiation, for example, in the radiological exploration of surfaces such as that of the earth, with a view toward locating ore bodies and the like.

Practically all rocks, on or under the surface of the earth, are radioactive to some degree. Since different rocks and rock strata differ in the kinds and intensities of the radiation which they emit, the detection of the radioactivity of these rocks has been practiced to some extent to distinguish between various rocks and rock strata and to locate ore bodies.

However, if the depth of the overburden above the radioactive rocks or rock strata is very great the radiation emanated from the rocks may be absorbed before it can reach the surface of the earth to a greater or lesser extent as a function of the depth and type of intervening material. Nevertheless, it has been found that an increase in the radioactivity at the surface of the earth which is above, or nearby, the location of the buried rocks may indicate the presence of this buried rock deposit.

Certain rocks deposits, such as zinc and lead sulfide ore deposits occurring as replacements in dolomite and overlain by several hundred feet of overburden may cause the intensity of the radiation at the surface of the earth above them to be less than that of the barren zones around the ore body.

In the former case, where the intensity of radiation increases as the ore body is approached, there is a positive anomaly. In the latter case, where the intensity of radiation decreases as the body is approached, there is a negative anomaly.

If the radioactive rocks or ore body lie on the surface of the earth, or are buried under a shallow cover, the radiation emanating from the rocks may easily penetrate to the surface of the earth. Such radioactivity may be detected by a conventional Geiger-Mueller counter or an ionization chamber carried above the surface of the earth. An increase in the counting rate of the Geiger-Mueller counter or of the current in the ionization chamber will indicate the presence of radioactive rocks.

However, if the rocks or ore bodies are deeply buried under the surface of the earth, only a small amount of the radiation emanated by such sources may reach the surface. The naturally occurring radioactive elements emit alpha, beta, and gamma rays in various proportions and with different energies. The alpha and beta rays have very little penetrating power; that of the gamma rays is higher, sufficiently so, that although relatively undetectable amounts of alpha or beta rays may reach the surface, some of the gamma rays may. Since only a relatively small proportion of the gamma rays emitted by the rocks may reach the surface of the earth in many cases a sensitive detector is required to detect and measure these gamma rays.

A sensitive detector is also required to detect the presence of a negative anomaly. The radiation detected at the surface of the earth which originates in barren rock may of itself be so weak that it is difficult to distinguish areas of less radiation, that is, a negative anomaly, from areas of barren rock.

Among the factors which must be taken into consideration when the results of a radiological survey are interpreted is the so-called "background radiation." The background radiation includes radiation received by the detector from its surroundings, exclusive of the particular sample measured, that is, the radiation that is always evident from various sources. Correction for such background radiation is desirable. A detector may be more or less substantially shielded from the softer components of the background radiation by a material such as lead. However, the more penetrating components of the background radiation, and especially cosmic radiation, are extremely difficult, if not impossible to exclude by any known substance. Thus cosmic radiation is considered as a constant factor in a radiological survey, and will not be further considered since its effect is eliminated by means of adequate blanks.

Hereinafter, the softer background radiation coming from the horizon above the detector is to be referred to as "aerial radiation." It is to be understood that this term does not include cosmic radiation.

The conventional Geiger-Mueller counter or ionization chamber is not sensitive enough to detect many of the very weak radiations emanating from the surface of the earth. Other more sensitive detecting devices, useful in their proper spheres of application, have been devised which can detect these weak radiations, but these devices require constant supervision and maintenance, and, in general, are expensive. In addition, the majority of such sensitive instruments are bulky and heavy and consequently difficult to transport and furthermore even where transportation is possible adequate electrical power supplies may not be available for the instruments in certain locations. The use of shielding to minimize the effects of background radiation adds to the bulk of some of these detecting devices and to the difficulty of handling them, as well as to the difficulty of making the measurements.

In overcoming the aforesaid disadvantages and in conducting a radiological survey to detect the presence of anomalies, one of the advantages of my invention is the provision of a method of radiological surveying whereby radiation emanating from within the earth and reaching its surface can be easily and accurately detected and measured.

Another advantage of the invention is the provision of a method of radiological surveying of the surface of the earth by means of which radiation at the surface of the earth, which is too small in amount to be accurately measured in a short time, may be accurately and conveniently measured by taking the measurement over an extended period of time.

Other advantages of the invention reside in the facts that the measurements can be made easily and conveniently, require very little maintenance and supervision, and are made with inexpensive, rugged, yet very accurate, equipment.

In contrast to other detecting devices used for conducting radiological surveys the apparatus of my invention is easily transported, even to difficultly accessible areas, and requires no electrical power supplies.

These, and other advantages, which will be disclosed and explained in the following, are attained in a method of radiological surveying wherein a plurality of thermoluminescent bodies is placed for exposure in a predetermined geometric array at a number of locations in the area to be surveyed. The thermoluminescent bodies are allowed to remain at the locations where they have been placed for a length of time sufficient to allow the radiation emitted in the immediate locale to react with the thermoluminescent bodies. This reaction results in the storage of such radiation as an accurately determinable quantity of latent luminescence within the thermoluminescent bodies.

The thermoluminescent bodies are then removed from their location of exposure and submitted to the action of radiation of very long wave length, that is, radiation of wave length from 0.00008 to 0.04 cm., in order to convert their latent luminescence into measurable luminescence which the bodies may emit as ultraviolet or visible light. The quantity of light emitted is measured by conventional means such as a photographic plate, Geiger-Mueller counters, scintillation-counters, a photoelectric device, or other appropriate means. The results of the measurements are correlated geometrically with the area under survey in regard to the position of each measuring element. Obviously certain corrections may be necessary as will be discussed later.

In order to define more explicitly the terms used in the foregoing, the phenomenon of luminescence must be considered. Briefly, without recourse to a description of the complex physical changes which actually occur, it can be stated that luminescence is the emission of radiation, usually visible or ultraviolet light, by a substance, generally termed a luminophor, after it has been excited by radiation of wave-length equal to or shorter than that emitted. Fluorescence and phosphorescence are types of luminescence. In the older literature it was held that fluorescence and phosphorescence were distinguished only by the criterion of an observable afterglow. That is, if the luminescence did not last longer than the exciting irradiation applied to the substance luminescing, the luminescence was called fluorescence; if the luminescence was visible for an appreciable length of time after the end of the excitation it was called phosphorescence. In the light of later discoveries it was found that this criterion did not hold, for afterglow was discovered which was not phosphorescence, but slow fluorescence. Further study led to the finding that the duration of a fluorescence process has only a second order dependence on temperature, whereas the duration of a real phosphorescence is directly dependent on temperature.

Thus phosphorescence is excited in a luminophor by radiation falling upon it and the phosphorescence is "frozen in." Afterwards, if the temperature of the luminophor is raised, the absorbed energy is set free and re-emitted as luminescence without any additional exciting irradiation.

Thermoluminescence is also luminescence which occurs when a luminophor, which has been previously excited at low temperatures, is heated. It is essentially the same process as that of phosphorescence, in that it is thought that thermal motion is responsible for the freeing of the absorbed energy. The difference lies in the fact that phosphorescence is initiated at a certain fixed temperature, while in thermoluminescence the temperature is increased.

These theories are presented only to clarify the phenomenon of luminescence in the light of certain modern views and are not to be considered as definitive or limiting insofar as the present invention is concerned.

Included in the term thermoluminescent body are those luminophors from which absorbed energy is set free after the body has been subjected to a radiation of very long wave length which excites thermal motion within the luminophor. The term "radiation of very long wave length" is understood to mean radiation having wave lengths from about 0.00008 cm. to about 0.04 cm. and includes infrared radiation and heat radiation.

Although the energy absorbed and stored by the thermoluminescent body is not properly considered as luminescence, it can be termed "latent luminescence" in the same sense that the term "latent heat" is applied, since it is this absorbed energy which gives rise to the actual luminescence when the stored energy is released under the suitable conditions.

Referring to the drawings, Figure 1 illustrates a plan for the location of the thermoluminescent bodies in the area to be surveyed.

Figure 4 represents a positive anomaly, while Figure 5 represents a negative anomaly.

Figure 1:
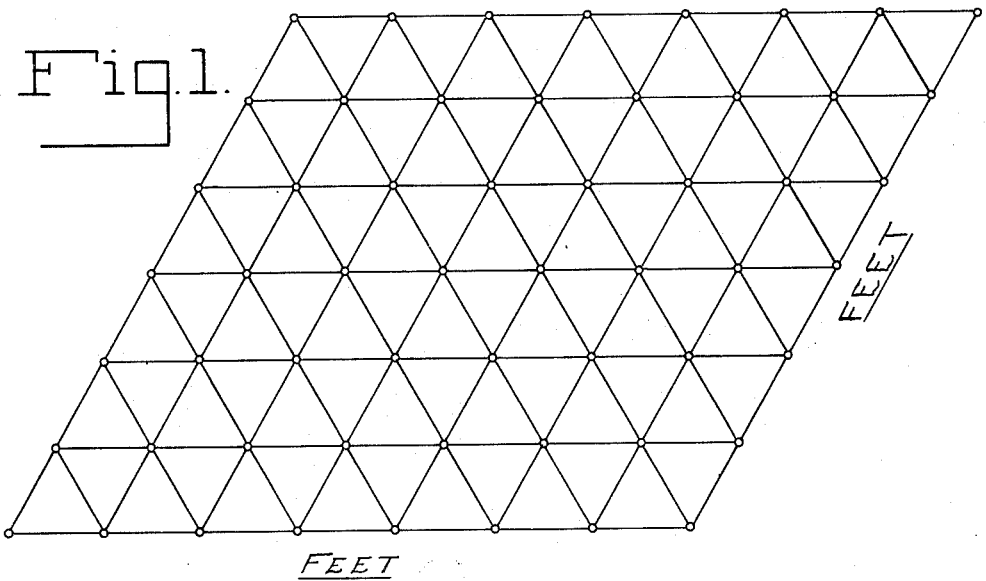

If a survey is to be made of the surface of the earth a plurality of thermoluminescent bodies is arranged in a geometric array on the surface of the ground. Figure 1 illustrates one such arrangement. As depicted here, the thermoluminescent bodies, designated by the numeral 1, are arranged at the corners of a number of contiguous equilateral triangles. The distance between each thermoluminescent body is known in order that subsequent to the survey the results can be interpreted geographically, for example, by means of a graph such as that illustrated in Figure 3. Any convenient geometric array can be used, as well as that depicted in Figure 1, and in fact, no rigidly defined geometry need be used as long as the positions of the thermoluminescent bodies is known with respect to a definite point of geographic reference.

Figure 2:
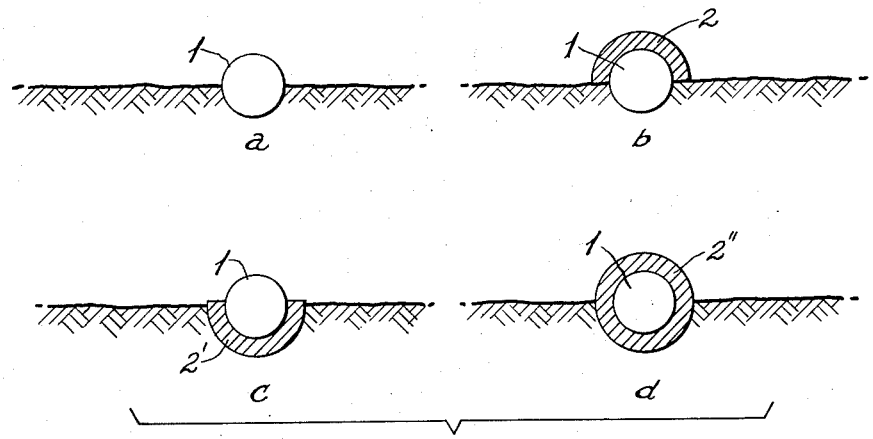
Figure 2 illustrates a thermoluminescent body, in its location in the area to be surveyed, in various shielded and unshielded modifications.

The thermoluminescent bodies themselves may be in any convenient form. A preferred form is shown in Figure 2 in which the thermoluminescent bodies 1 are depicted as being spherical. In order to insure their remaining in the place in which they were located the thermoluminescent bodies are shown as placed in shallow depressions in the earth.

Figure 2(a) illustrates an unshielded thermoluminescent body 1. In this position a thermoluminescent receives not only the radiation emanating from the surface of the earth but also background radiation.

Figure 2(b) illustrates a thermoluminescent body covered on its upper side by a shield 2, preferably of lead. The use of a shield as depicted here will protect a thermoluminescent body from a substantial portion of the incoming aerial radiation. Thus Figure 2(b) represents a body which measures radiation emanating from the surface of the earth while being shielded from a substantial portion of aerial radiation.

Figure 2(c) illustrates a thermoluminescent body covered on its lower side by a shield 2'. Such shielding protects a thermoluminescent body from a substantial portion of the radiation originating from the surface of the earth, thus as illustrated here, the body in essence measures radiation from the horizon above the body, including aerial radiation.

Figure 2(d) illustrates a thermoluminescent body substantially completely surrounded by a shield 2''. So shielded, the thermoluminescent body receives only the harder components of the background radiation.

Figure 3:
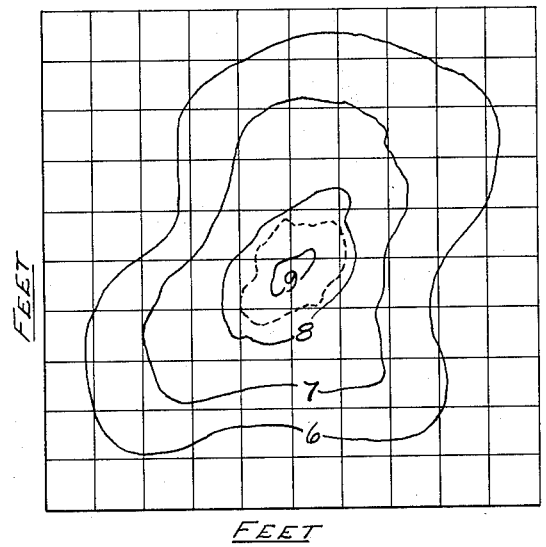
Figure 3 illustrates a graphical representation of a surface survey made in an area.

If the measurements are made with 2(a) or 2(b) arrangements the procedure may follow the steps: (a) arranging the bodies, as shown in Figure 2(a), in a predetermined geometric array, for example, as shown in Figure 1. (b) Permitting radiation from the earth to react with the bodies and form latent luminescence within them. The time required for sufficient latent luminescence to be formed may be estimated from a general knowledge of the kind and intensity of the radiation emitted from the area under survey, or may be determined by a series of pre-survey test exposures of thermoluminescent bodies. (c) Removing the thermoluminescent bodies from the area and then heating them or exposing them to infrared radiation in order to release, as luminescence, the latent radiation luminescence. (d) Measuring the quantity of luminescence released by means of a device which measures light. (e) Mathematically correlating the measurement of the luminescence emitted with the radiation received by the body, and (f) Interpreting these results in terms of the area surveyed, for example, as shown in Figure 3.

In order to account for the effect of background radiation, blank readings are required. Such blank readings may be obtained by one of the following methods. In one of these methods certain values obtained from the survey may be chosen as blank readings. In the case of positive anomalies the readings are suitable as blanks provided they are substantially lower than the average of the higher readings, and that a sufficient number of corresponding low readings are found. In the case of negative anomalies the readings are suitable as blanks if the values are substantially higher than the average of the lower readings.

In another method, a plurality of thermoluminescent bodies, substantially similar to those used in the survey, are kept shielded from radiation at some other place than the area under survey.

In either method, the blank values are averaged and the average value subtracted from each individual value of luminescence emitted by the thermoluminescent bodies used in the survey.

The preferred method of making a survey involves the use of two types of the above described forms of thermoluminescent bodies one of which, usually that receiving the least quantity of radiation, is used as a "blank." If two types are used, six combinations are possible. Of these combinations the measurements are preferably made with the combinations, referring to Figure 2, $a$ and $c$, or $b$ and $d$, whereby the difference in the measurements obtained from $a$ and $c$, or those from $b$ and $d$, is used in interpreting the results of the survey. The combination of $b$ and $d$ is the most useful since if the aerial radiation is large relative to the radiation from the earth, the difference between the measurements obtained from $a$ and $c$ may lead to inaccurate results because of certain statistical limitations. For if two quantities, which are expressed in the same terms, are measured simultaneously, and one of the quantities is large in proportion to the other, the smaller quantity tends to become less significant the smaller it is in relation to the larger quantity. Thus, if the quantity of aerial radiation received by a thermoluminescent body is large in proportion to that emanated by the earth, the use of the combination of $a$ and $c$ may lead to erroneous results. The combination $a$ and $c$ is useful when the quantity of aerial radiation received is relatively small, whereas the combination at $b$ and $d$ is useful under all conditions of aerial radiation.

The thermoluminescent bodies, shielded or unshielded, may be exposed to the radiation from the area under survey for any desired length of time, but it is preferred that those used in any one survey be exposed for the same length of time. It is also desirable that in the case where a combination of two types of thermoluminescent bodies are used that a pair of the two types be placed in close proximity to each other, although the number of "blank" types need not equal the measuring types in number and may be only a few in number.

In order to protect the thermoluminescent bodies from wind, rain, dirt, or other external conditions the bodies may be covered by materials which will afford protection from these elements, but which are essentially transparent to radiation. For example, the thermoluminescent bodies can be coated with a wax, covered with a plastic, enclosed in glass or quartz, or surrounded by thin jackets of a ceramic or metal which does not interfere with the reception of radiation by a thermoluminescent body.

In making these surveys the thermoluminescent bodies, including those used as blanks, preferably contain the same mass of luminophor, and are of substantially the same geometrical form in order to permit each measurement to be a more easily correlated to the other measurements.

In any given survey it is also preferred that the thermoluminescent bodies be of the same chemical composition. Among the known thermoluminescent substances which may be used in practicing the invention are: $Zn_2SiO_4$:Mn; $Zn_2GeO_4$:Mn; ZnS:Mn; ZnS:Mn, Cu; $CdSO_4$:Mn; $CaSO_4$:Mn; SrS:Ce, Sm; diamond, rock salt, lithium aluminum silicates, calcites, fluorites, apatites, zircons, impure sulfates, impure carbonates, and As-activated Zn, ZnCd silicates, and $Sr(S:Se):SrSO_4:CaF_2:Sm:Eu$.

Any number of the thermoluminescent bodies may be used in a survey, depending upon the geometric array used. In certain instances it may be found that the use of a few thermoluminescent bodies is sufficient to obtain the information desired for certain given areas.

Since the latent luminescence will remain stored within a thermoluminescent body until the body is heated or exposed to radiation of very long wave length, the quantity of luminescence which the thermoluminescent bodies will emit as a consequence of this latent luminescence need not be determined immediately after exposure to the radiation from the earth. The thermoluminescent bodies may be removed from their locations, transported to, and stored in a relatively cool place, well-shielded from any kind of penetrating radiation, for any desired length of time before they are exposed to radiation of very long wave length for the purposes of measurement.

In order to insure that no latent luminescence is present in the thermoluminescent bodies prior to their use in a survey, the bodies may be subjected to treatment with radiation of very long wave length, or they may be heated, until no more luminescence is emitted by them. Preferably, this pre-treatment should be a procedure exactly as used in the measurements. Obviously an exposed and measured thermoluminescent body is immediately restored to a condition for use in a subsequent survey if such technique is used. The various materials will require different degrees and times of pretreatment which is best determined for each specific material employed.

Since essentially all the latent luminescence present in a thermoluminescent body can be removed by subjecting the body to radiation of very long wave length or by heating, the thermoluminescent bodies can be re-used after a survey has been completed. This property of thermoluminescent bodies adds to the relative inexpensiveness, utility, and convenience of radiological surveys made according to the method of the invention.

Figure 3 illustrates an application of the invention in a surface survey of an area known to contain an ore body above which there is more radiation emitted from the surface of the earth over the ore body than from zones surrounding it. A rectangular grid has been surveyed over the area, and thermoluminescent bodies, as illustrated in Figure 2, exposed simultaneously at the grid intersections. The thermoluminescent bodies are exposed for equal times, collected, subjected to radiation of very long wave length, and the absorbed luminescence emitted by the individual thermoluminescent bodies determined. After the determinations are completed, section and points of equal value are joined by "contours" or "isoradins." The isoradins are closed loops, one around another where the survey area is sufficiently large, with the values decreasing from 9 to 6 as the distance from the ore body increases. Thus Figure 3 represents a survey of a positive anomaly created by an ore body. If Figure 3 were to represent a negative anomaly created by an overlaid ore body the values would increase as the distance from the ore body increased.

Figure 4:
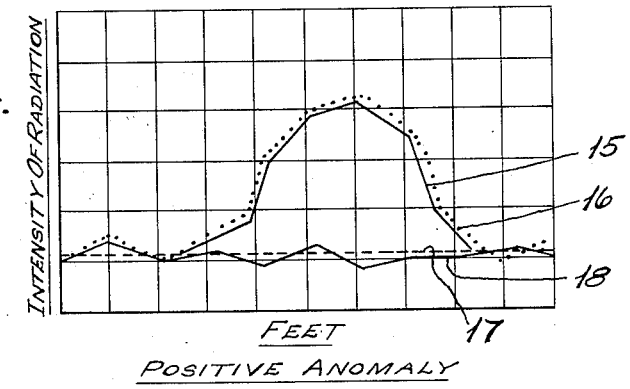
Figures 4 and 5 represent graphs which show readings taken in an underground survey.
Figure 5:
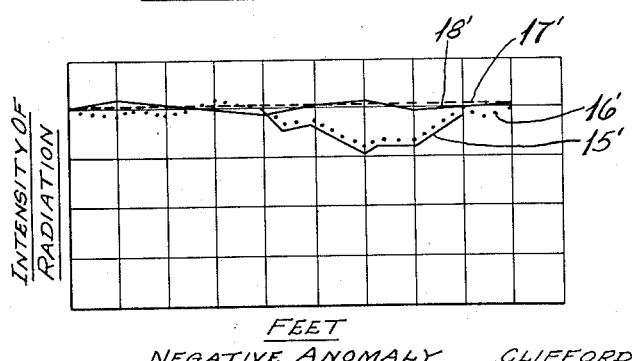

Figures 4 and 5 illustrate the application of the invention to an underground survey. A plurality of thermoluminescent bodies, as depicted in Figure 2 and treated as explained hereinbefore, are placed at known spaced intervals in a borehole, along a drift, or in other underground openings in some convenient manner such as a vertical line. The thermoluminescent bodies are exposed for substantially the same length of time to radiation from the earth, removed, subjected to radiation of very long wave length to convert their latent luminescence into luminescence, and then the emitted luminescence determined. The values are plotted in the form of a graph as shown in Figures 4 and 5. The graph of Figure 4 depicts a positive anomaly; that of Figure 5 a negative anomaly.

The use of the method of the invention, in which thermoluminescent bodies are employed to detect radiation, is not limited to the prospecting procedures outlined above. For example, the method may be used to measure the intensity of radiation from hand samples taken in prospecting. In other words, samples from the area under survey may be brought to thermoluminescent bodies in a laboratory which is the converse of the method heretofore described. The method may be used to survey areas other than the surface of the earth, for example, the surface or bottom of a body of water, or of a laboratory area contaminated by a radioactive substance, and may also be used as a detector of radiation from other sources such as artificial radioisotopes used in medical diagnosis and research. It is also apparent that the method described herein may be used to detect or measure radiation in locations which are inaccessible to conventional detectors of radiation. Small thermoluminescent bodies may be located, for example, behind apparatus, rocks, debris, etc., or may be placed in small depressions, which are unavailable to instruments such as detectors of the Geiger-Mueller or ionization chamber type.

The method of surveying of the invention is inexpensive and does not require any special equipment or handling. A thermoluminescent body may be re-used over and over again in surveying and the cost of the surveys made is so low that a great number of the thermoluminescent bodies may be used simultaneously. Maintenance cost of the thermoluminescent bodies is low and once the bodies are placed in the area to be surveyed they need no further surveillance until it is time for them to be removed from the area. Since the actual measurement of the luminescence can be made in a laboratory under rigidly controlled conditions, the measurements can be more accurate than those made under field conditions.

Obviously, many modifications and variations of the above invention as herein set forth may be made without departing from the spirit and scope thereof, therefore, only such limitations should be imposed as are indicated in the appended claims.

I claim:

1. In geophysical exploration by radioactivity detection, the improvement which comprises disposing at least one thermoluminescent body adjacent a portion of earth to be investigated, exposing said body to radiation emitted from said portion for a predetermined length of time whereby said radiation causes latent luminescence to be formed in said thermoluminescent body, thereafter subjecting said thermoluminescent body to radiation having wave lengths of approximately 0.00008 to 0.04 cm. thereby releasing said latent luminescence from said thermoluminescent body as a result of said last-mentioned radiation, and quantitatively measuring said latent luminescence so released.

2. In geophysical exploration by radioactivity detection, the improvement which comprises disposing thermoluminescent bodies for a predetermined length of time as a geometric array in a plurality of locations of the earth throughout a zone to be investigated, exposing said bodies to natural radiation emitted from the earth at each of said locations for a predetermined length of time, whereby said radiation causes latent luminescence to be formed in said thermoluminescent bodies, thereafter subjecting said thermoluminescent bodies to radiation having wave lengths of approximately 0.00008 to 0.04 cm. thereby releasing said latent luminescence from said thermoluminescent bodies as a result of said last-mentioned radiation, and quantitatively measuring said latent luminescence so released.

3. The method of exploration according to claim 2 wherein said luminescent bodies are zinc sulfide luminophors.

4. The method of exploration according to claim 2 wherein said thermoluminescent bodies have the following composition: $Sr(S:Se):SrSO_4:CaF_2:Sm:Eu$.

5. In geophysical exploration by radioactivity detection, the improvement which comprises disposing thermoluminescent bodies for a predetermined length of time as a geometric array in a plurality of locations of the earth throughout a zone to be investigated, exposing said bodies to penetrative radiation from the earth at each of said locations for a predetermined length of time, whereby said radiation causes latent luminescence to be formed in said thermoluminescent bodies, simultaneously maintaining in said zone as a blank at least one substantially similar thermoluminescent body while shielding said blank from said radiation, thereafter subjecting all said thermoluminescent bodies to radiation having wave lengths of approximately 0.00008 to 0.04 cm., thereby releasing latent luminescence from said thermoluminescent bodies, quantitatively measuring the luminescence released from each of said bodies, and correcting the values of light emission from said first-named luminescent bodies by the value for said blank.

6. In geophysical exploration by radioactivity detection in accordance with claim 2, the additional steps of shielding said thermoluminescent bodies from cosmic radiation, disposing at least one substantially similar thermoluminescent body as a blank in said zone, and shielding said blank from substantially all radiation.

7. In geophysical exploration by radioactivity detection in accordance with claim 2, the additional steps of comparing the measurements of luminescence from said bodies with one another, and correlating said measurements with the locations of said bodies in said zone to establish the nature of the adjoining earth.

References Cited in the file of this patent

UNITED STATES PATENTS

| | | |
|---|---|---|
| 2,074,226 | Kunz et al. | Mar. 16, 1937 |
| 2,227,438 | Campbell | Jan. 7, 1941 |
| 2,269,889 | Blau | Jan. 13, 1942 |
| 2,482,813 | Urbach | Sept. 27, 1949 |
| 2,506,749 | Schulman et al. | May 9, 1950 |
| 2,562,969 | Teichmann | Aug. 7, 1951 |
| 2,573,245 | Boyd et al. | Oct. 30, 1951 |

OTHER REFERENCES

Solid Luminescent Materials—Symposium held at Cornell University October 24–26, 1946, published by John Wiley & Sons Inc., New York, 1948, pp. 33–35.